United States Patent [19]

Popper

[11] 4,370,888
[45] Feb. 1, 1983

[54] VIBRATORY WEIGHING APPARATUS

[75] Inventor: Jakhin B. Popper, Kiryat Motzkin, Israel

[73] Assignee: Popper Engineering Co., Ltd., Haifa, Israel

[21] Appl. No.: 206,547

[22] Filed: Nov. 13, 1980

[30] Foreign Application Priority Data

Nov. 23, 1979 [IL] Israel .................................. 58783

[51] Int. Cl.³ .............................................. G01G 3/16
[52] U.S. Cl. ..................................... 73/580; 177/165; 177/210 FP
[58] Field of Search ................... 73/580; 177/210 FP, 177/165

[56]     References Cited
U.S. PATENT DOCUMENTS

| | | |
|---|---|---|
| 2,305,783 | 12/1942 | Heymann et al. .................... 73/580 |
| 2,974,863 | 3/1961 | Williams, Jr. et al. . |
| 3,077,940 | 2/1963 | Blodgett et al. . |
| 3,354,698 | 11/1967 | Christmann . |
| 3,423,999 | 1/1969 | Wirth et al. . |
| 3,519,093 | 7/1970 | Ramsay .......................... 177/210 FP |
| 3,555,886 | 1/1971 | Thornton . |
| 3,572,098 | 3/1971 | Fogwell . |
| 3,967,497 | 3/1976 | Brown . |

*Primary Examiner*—James J. Gill
*Attorney, Agent, or Firm*—Sandler & Greenblum

[57]     ABSTRACT

Weighing apparatus for determining the tare and net weights of a container containing a liquid or a substance behaving like a liquid without requiring separate weighing of the empty container or its contents including apparatus for applying force to the container whereby force interactions between the liquid and the container are negligible for at least a predetermined measuring duration; and apparatus for sensing characteristics of the force applied to the container and of the motion of the container at the measuring duration for determining the tare weight of the container.

4 Claims, 10 Drawing Figures

VIBRATORY WEIGHING APPARATUS

FIELD OF THE INVENTION

The present invention relates to weighing apparatus and more particularly to vibratory weighing apparatus.

BACKGROUND OF THE INVENTION

The present invention is directed at a particular problem, the determination of the net or tare weight of a container which contains an unknown quantity of a liquid or of a bulk material which behaves similarly to a liquid. This determination is of practical importance in a number of industries. For example, in the bottled gas industry it is important that the gas container be filled with a proper weight of liquified gas, in order to prevent possible explosion or shortchanging of customers. Since the weights of the containers differ and the containers normally do not arrive empty at the filling machine, it is customary to manually determine the tare weight from an empty weighing which may be noted on the container and to subtract this weight from the final filled weight. The filling process is therefore a relatively slow manual process.

Another example of the need for a weighing system of the type described is in the weighing of precious liquids. Such liquids are normally sold in small bottles of a tare weight which is unknown to the buyer. At present the buyer can confirm the net weight only by placing the liquid in a container of known tare and weighing it.

Vibratory weighing apparatus is known in the prior art, but no such devices have been proposed or used for weighing of liquids and for determining separately the weight of the container and the liquid. Examples of vibratory weighing apparatus are found in the following U.S. Pat. Nos. 3,555,886; 3,967,497; 3,423,999; 3,354,698; and 3,572,098. Conventional tare-weighing apparatus which does not employ vibratory weighing is disclosed, for example, in U.S. Pat. Nos. 3,077,940 and 2,974,863.

SUMMARY OF THE INVENTION

The present invention seeks to provide weighing apparatus capable of determining the tare and net weights of a container containing a liquid or a substance behaving like a liquid without requiring separate weighing of the empty container or its contents.

There is thus provided in accordance with an embodiment of the present invention weighing apparatus comprising apparatus for accelerating and decelerating a container containing a liquid in a manner such that the forces exerted on and by the liquid are negligible at least for a predetermined time and apparatus for sensing characteristics of force applied to the container and of the motion of the container for determining the tare weight of the container.

In accordance with one embodiment of the invention the apparatus for accelerating and decelerating comprising apparatus for vibrating a container containing a liquid at a frequency selected so as not to substantially vibrate the liquid inside the container and the sensing apparatus comprises apparatus for sensing the relationship between the magnitude of the force applied by the vibrating apparatus and the amplitude of vibration of the container for providing an indication of the tare weight of the container.

In accordance with an alternative embodiment of the present invention the apparatus for accelerating and decelerating comprises apparatus for initially accelerating a container containing liquid and for subsequently terminating the acceleration and apparatus for applying a braking force to the container following termination of the acceleration thereof. The apparatus for sensing comprises a first sensor for measuring the braking force and a second sensor for measuring the deceleration of the container produced by the braking force.

Any suitable type of vibrating or accelerating and decelerating apparatus may be employed, including a vibrating eccentric mass or an electromagnet. Visual or electrical sensing apparatus may be employed for sensing the amplitude or deceleration of the container.

BRIEF DESCRIPTION OF THE DRAWINGS

The invention will be more fully understood and appreciated from the following detailed description taken in conjunction with the drawings in which.

DETAILED DESCRIPTION OF THE INVENTION

Figure 1:
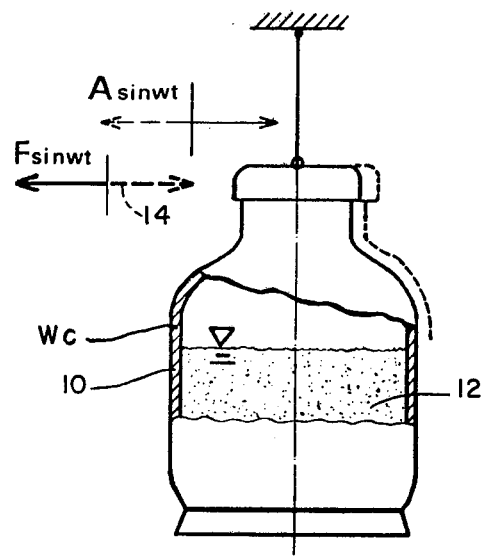
FIG. 1 is a schematic illustration of a liquid-containing container.

Referring now to FIG. 1 there is seen a container 10 containing a liquid 12 which partially fills container 10. A vibrating force $F_2 = F \sin \omega t$ is applied along an axis indicated by a reference numeral 14. It is to be understood that the term liquid is used herein and in the claims to describe liquids as well as bulk solids which behave substantially as liquids. The container 10 vibrates along axis 14 with an amplitude A.

The tare weight of the container is given by:

$$W_c = F\delta/A \tag{1}$$

where:

$$\delta = b/\omega^2 \tag{2}$$

and:

$$\omega = (\pi/30)n \tag{3}$$

g=gravitational acceleration of the earth; n=the periodicity of the vibrating force in cycles per minute.

It is to be noted with particularity that the vibration frequency is selected to avoid the natural frequencies of vibration of the liquid contained in the container. Normally a relatively high frequency of vibration with n=3000 is employed, and this is much greater than the lowest order natural frequency of the liquid. The higher orders of the natural frequency of the liquid must equally be avoided. The various orders of natural frequencies of the liquid are ordinarily determined empirically.

It should be appreciated that equation 1 represents the most general relationship between force F, amplitude, frequency and the weight $W_c$. F represents the total or resultant force that acts on the corresponding $W_c$ and thus must be measured directly. Therefore if $W_c$ is pressed against a vibrating tray or other vibrating element by a spring then one has to introduce a force sensing element such as a piezoelectric crystal between the tray and $W_c$ and read the force fluctuation $F \sin \omega t$ by means of that element. The F thus measured is introduced into equation 1.

In practice, the container is vibrated at a frequency which is known empirically to be at least close to the frequency at which the liquid does not vibrate. The vibratory apparatus is constructed to have a variable frequency so as to enable its frequency to be varied at least slightly. As the frequency is varied, the output indication of the weighing apparatus is sensed. The desired frequency is the frequency at which the lowest weight reading is provided. Once this frequency is known, the corresponding amplitude may be sensed and a weight indication output may be provided.

When the container is vibrated at a frequency at which the liquid does not vibrate, the acceleration force reactions, which are the only reactions sensed, are only those of the container itself. Since these forces are directly proportional to the mass, i.e. the weight of the container, they provide the necessary indication of the tare weight of the container.

The measurement of A, the amplitude of vibration of the container, can be accomplished optically by means of the well known technique. This measurement can be accomplished even more reliably by means of a technique described hereinafter in association with FIGS. 2 and 3. An amplitude gauge is produced by drawing lines in the pattern indicated in FIG. 2 either on the container or on a body which vibrates together therewith. The separation between the lines corresponding to each amplitude is equal to 2A. As indicated in FIG. 2 a pattern of dots or any other suitable indicator may be used instead of or in addition to the lines.

Figure 2:
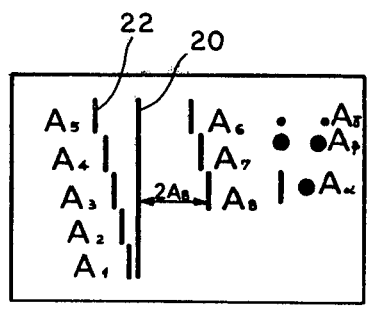
FIG. 2 is a schematic illustration of an amplitude gauge.
Figure 3:
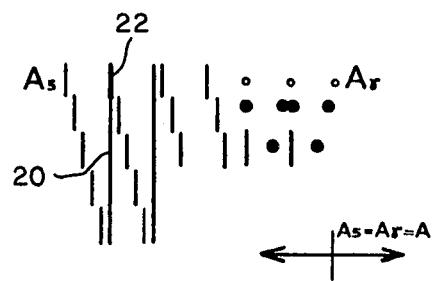
FIG. 3 is a schematic illustration of the gauge of FIG. 2 as seen during vibration at an amplitude $A_5$.

When vibrating, the gauge of FIG. 2 appears to an observer as seen in FIG. 3. Effectively all of the indicators are doubled. The spacing between respective ones of doubled indicators indicates the amplitude and is equal to 2A. Here the long vertical line 20 overlaps a short line 22 indicating an amplitude $A_5$ and thus indicates that the amplitude of vibration is $A_5$.

Alternatively the amplitude can be measured by any suitable transducer, which may be electric or pneumatic, for example. The sensed information can then be fed into an on-line computer.

The applied vibration force F can be produced by a variety of means, such as an electromagnetic transducer, a spring, a piston, a crank, a centrifugal weight or any combination of the above or of any suitable device. Where electromagnets are employed, the electrical current passing through the electromagnet can be measured to provide an indication of the force F for a given amplitude A.

It is appreciated that any suitable means for vibrating the container at a desired frequency can be employed in the apparatus of the present invention.

Figure 4:
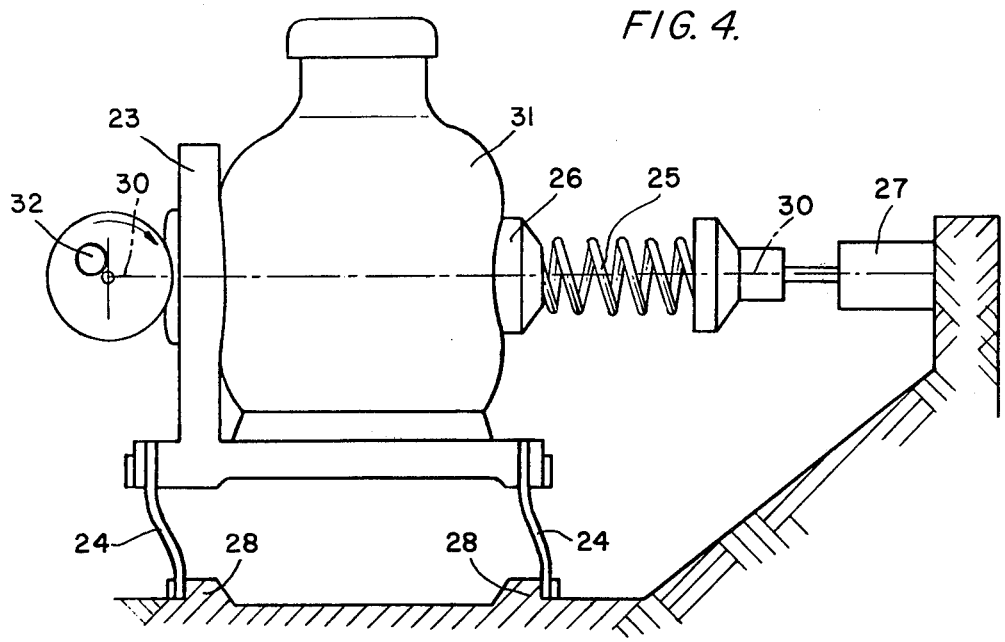
FIG. 4 is a schematic illustration of vibrating apparatus constructed and operative in accordance with an embodiment of the present invention.

Reference is now made to FIG. 4 which illustrates vibrating apparatus useful in the present invention. A base 23 supports a container 31 which it is sought to vibrate. Base 23 is mounted via leaf springs 24 onto a foundation 28. Container 31 is secured onto base 23 by a pneumatic piston and cylinder 27 which in turn forces a holding member 26 against the container. Holding member 26 is connected to the piston by means of a coil spring 25 which permits vibratory motion of the container along an axis 30. Apparatus for rotating eccentric weights 32 is coupled to base 23 for causing vibration of the base 23 and the container 31 along axis 30 at a predetermined frequency. The configuration, construction and placement of springs 24 and 25 and the characteristics of the rotating weight apparatus 32 determines the force F which produces the vibration of the container. Here $W_c$ is the sum of the weights of the holding member 26, the base 23, the apparatus 32 and the tare weight of the container 31.

Figure 5:
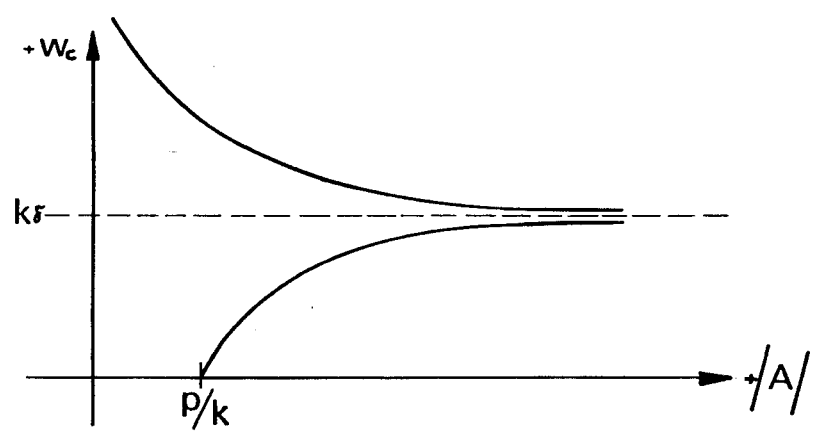
FIG. 5 is a graph illustrating the relationship between vibration frequency and amplitude for the apparatus of FIG. 4.

The relationship between amplitude A and weight $W_c$ is illustrated in the graph of FIG. 5. Here K is the sum of the spring rates of all of the springs 24 and 25 and p is the amplitude of the vibrational force. It is clear from the graph of FIG. 5 that each amplitude may indicate two possible weights $W_c$. In order to avoid ambiguity, the springs should be constructed to be either very soft where $K < W_c/\delta$ or hard where $W_c < k\delta$ It is noted that in any case, the device becomes very sensitive close to resonance provided that relatively little damping is involved. This region is useful only when the dispersion in container tare weights to be measured is comparatively narrow.

Figure 6:
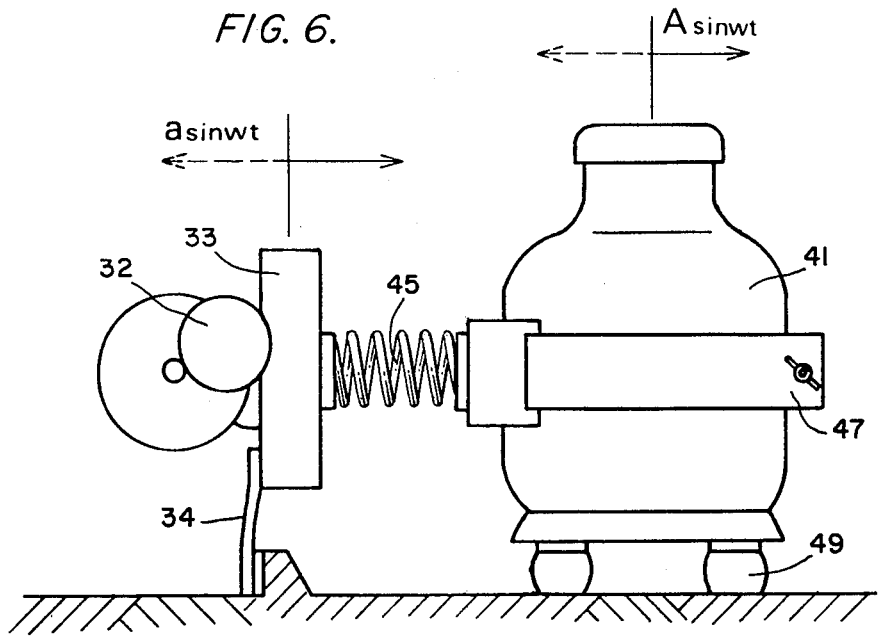
FIG. 6 is an illustration of vibrating apparatus constructed and operative in accordance with an alternative embodiment of the invention.

Reference is now made to FIG. 6 which shows vibrating apparatus which vibrates the container whose tare is to be measured by a constant amplitude. A rotating eccentric weight device 32 is mounted onto a base 33 which is in turn mounted, via a soft leaf spring 34 onto a foundation. Device 32 typically comprises an electric motor having eccentric weights disposed in in-phase relationship on the two ends of its output shaft.

Base 33 is coupled to a containe r41 by a coil spring 45 which is attached to a clamp device 47 secured around the container. The container is supported onto the foundation by means of soft pads 49. In this configuration $A_c$, the vibration amplitude of the container remains constant so long as $\omega$ remains constant.

$A_c$ is ascertained by the equation:

$$W_b = k\delta \qquad (4)$$

where:
  $W_b$ is the weight of the base 33 together with the rotating eccentric weight device 32; and
  k is the spring rate of coil spring 45.

Variations in $W_c$ cause changes in the amplitude a of base 33 and thus the measure of the amplitude a indicates the value of $W_c$, the tare weight of the container 41.

The provision of a constant amplitude $A_c$ is particularly advantageous where the tare weight of sensitive containers must be measured and thus the amplitude of vibration thereof must be limited.

Figure 7:
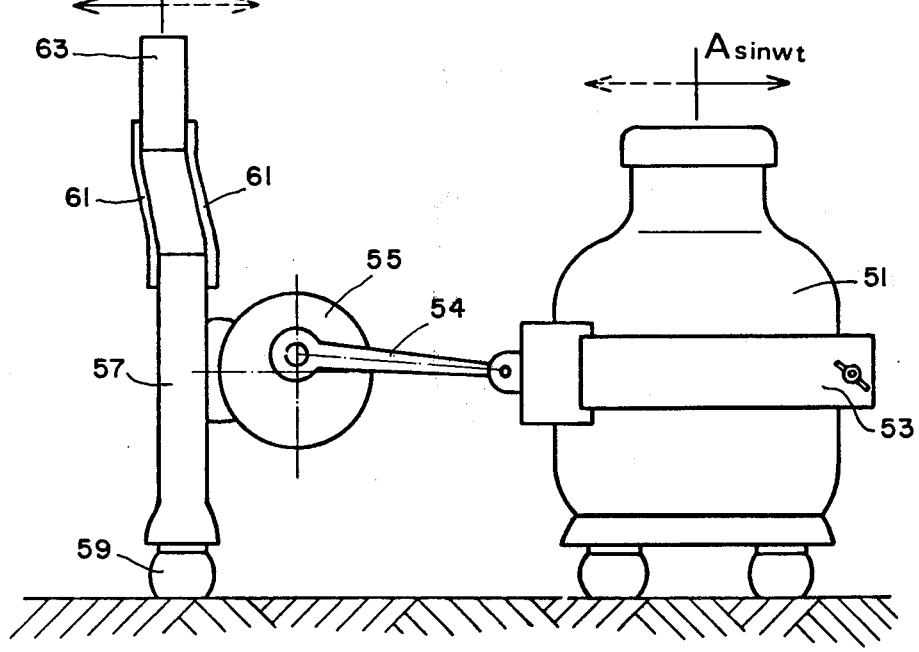
FIG. 7 is an illustration of vibrating apparatus constructed and operative in accordance with yet another alternative embodiment of the invention.

Reference is now made to FIG. 7 which illustrates another embodiment of vibrating apparatus which provides constant amplitude vibration of the container. Here a container 51 is coupled via a clamp device 53 to the arm of a crank 54 which is eccentrically driven by motor apparatus 55. Motor apparatus 55 is in turn mounted onto a base 57 which is supported on a foundation by a soft pad 59 and which is coupled via leaf springs 61 to an auxiliary mass 63. Here the amplitude of vibration of the container $A_c$ is constrained to be always equal to the eccentricity of the crank 54. The weight of the container 51 is linearly related to the amplitude a of the auxiliary mass 63 whose weight is $W_a$. This is ensured by the fulfillment of the following equation:

$$W_a = k_4 \delta \qquad (5)$$

where $k_4$ represents the rate of springs 61. and the supporting pads 59 are comparatively soft.

Figure 8:
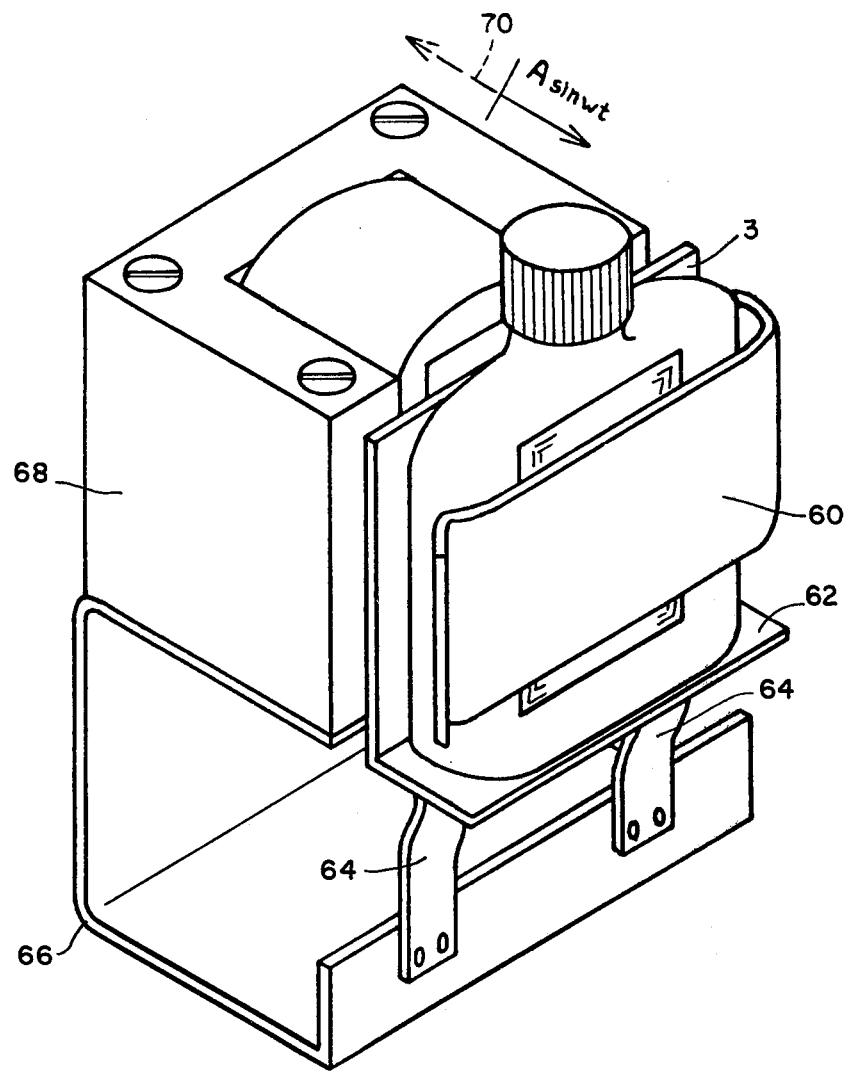
FIG. 8 is an illustration of vibrating apparatus constructed and operative in accordance with still another alternative embodiment of the invention.

Reference is now made to FIG. 8 which illustrates a compact tare weighing system constructed and operative in accordance with an embodiment of the invention and particularly suitable for small bottles. A bottle whose tare weight is to be measured is secured in a flexible clamp 60 which rigidly secures the bottle to a base 62. Base 62 is supported on a pair of relatively hard leaf springs 64 which are in turn attached to the frame 66 of the device. An electromagnet 68, also mounted on the frame 66, and operating in an AC mode exerts a generally sinusoidal force $F \sin \omega t$ on the base 62 and on the bottle causing the base and bottle to vibrate along axis 70 with an amplitude A.

The device illustrated in FIG. 8 is operated by increasing the AC current gradually until a predetermined amplitude $A_c$ of vibration of the container is reached. At this point the current indicates the tare weight of the container. It is noted that the springs 64, if sufficiently hard, add to the force produced by the electromagnet, thus drawing lower currents than otherwise would be the case.

Figure 9:
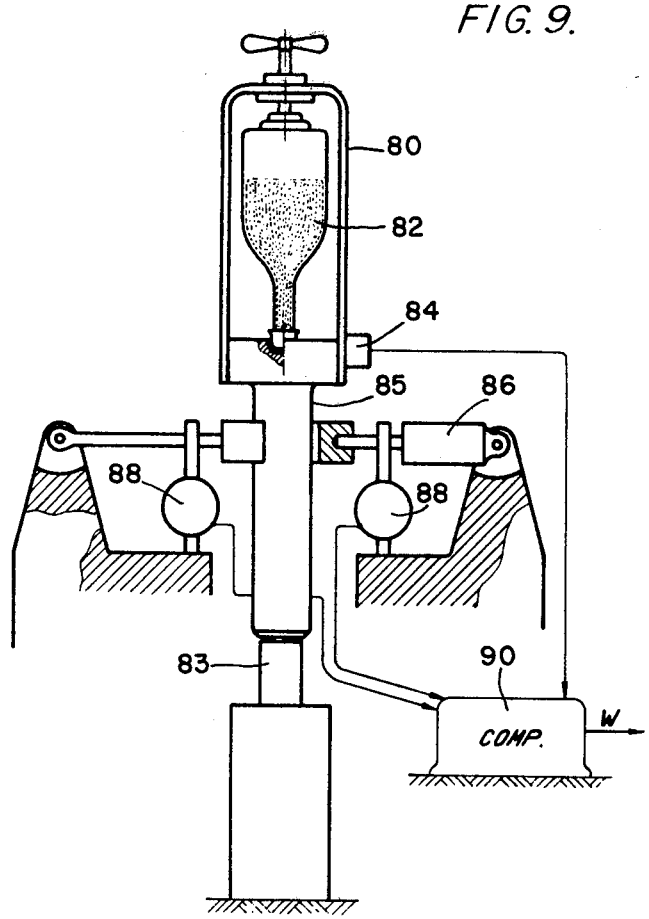
FIG. 9 is a schematic illustration of weighing apparatus constructed and operative in accordance with an alternative embodiment of the invention.

Reference is not made to FIG. 9 which is a schematic illustration of weighing apparatus constructed and operative in accordance with an alternative preferred embodiment of the invention. The weighing apparatus comprises a mounting assembly 80 which is configured as desired to accomodate a liquid containing container 82, such as a bottle. Assembly 80 is mounted on an accelerating piston 83 which is arranged to provide a desired linear accelerating force to a shaft 85 along a desired axis, preferably the vertical axis. Shaft 85 is rigidly connected to assembly 80.

There is associated with the mounting assembly 80 a deceleration sensor 84 for measuring the deceleration of the container 82. This deceleration is provided by a braking piston assembly 86 which engages shaft 85, which, as noted above, is connected to assembly 80. Load cells 88 or any other force measuring device are connected to the braking piston 86 for measuring the exerted braking force on the piston 83 and thus on the container. Electrical outputs from sensor 84 and from load cells 88 are supplied to conventional computing circuitry such as a microprocessor 90 which provides an electrical output representative of the tare weight of the container in accordance with the following equation:

$$W = P \frac{1}{\frac{d}{g} - 1} - z \qquad (6)$$

where:

P is the braking force measured by load cells 88;
d is the deceleration measured by sensor 84;
g is gravitational acceleration;
z is the known weight of the mounting assembly 80; and:
W is the tare weight of the container.

The operation of the apparatus of FIG. 9 will now be described briefly. A container 82, such as a bottle or any container containing a liquid, whose tare weight it is desired to determine is placed in mounting assembly 80 and securely attached thereto. Accelerating piston 83 is operated to accelerate the container upwardly and then deactivated, thus allowing the container to move upward without external forces other than g being exerted thereon and allowing the liquid in the container to float freely in the container. The braking piston assembly is then operated, suddenly decelerating the assembly 80 and the container and this deceleration is immediately measured. Since, at least at the beginning of the deceleration, the liquid does not participate, as it floats at that moment in the container without enaging the walls thereof, the relationship between the braking force and the deceleration is indicative of the weight of the container and mounting assembly alone. It is appreciated that the faster the braking and deceleration measurement is executed, and the lower the time therebetween, the more accurate is the weight measurement.

Figure 10:
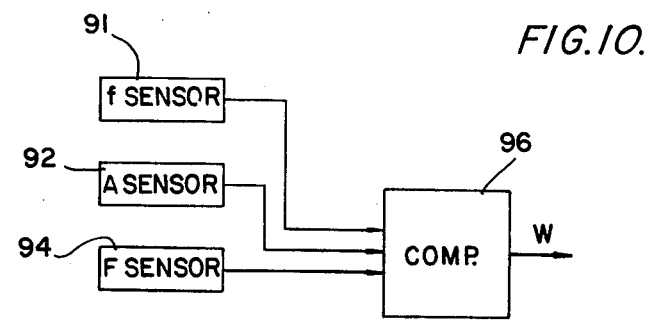
FIG. 10 is a block diagram of weight indicating apparatus useful in the invention.

Reference is now made to FIG. 10 which illustrates in block diagram form apparatus for automatically indicating tare or net weight of a liquid containing container, in accordance with an embodiment of the invention. The apparatus comprises a frequency sensor 91 which may be optical, electrical or of any other conventional type and which senses the frequency of the force applied to the container as by the apparatus of any of FIGS. 4–8. An amplitude sensor 92, which may be optical, electrical or of any other conventional type senses the amplitude of vibration of the container in response to the applied force. A force sensor 94 may also be provided, although this may not be necessary when the force F is known in advance. The outputs of all of the sensors are supplied to computation apparatus 96 typically comprising a microprocessor which provides an output which represents, selectably, either the tare weight of the container or its net weight. The tare weight is computed in accordance with equation (1) hereinabove and the net weight is computed by weighing the container and its contents as by a conventional technique and subtracting the tare weight.

It will be appreciated by persons skilled in the art that the invention is not limited to what has been particularly shown and described hereinabove. Rather the scope of the present invention is defined only by the claims which follow.

I claim:

1. Weighing apparatus comprising:
    means for applying force to a container partially filled with a liquid whereby force interactions between the liquid and the container are negligible for at least a predetermined measuring duration; and
    means for sensing characteristics of the force applied to the container and of the motion of the container at said measuring duration for determining the tare weight of the container;

wherein said means for applying force comprises means for initially accelerating a container containing liquid and for subsequently terminating the acceleration and means for applying a braking force to the container following termination of the acceleration thereof; and wherein said sensing means comprises a first sensor for measuring said braking force and a second sensor for measuring deceleration of the container produced by the braking force.

2. Weighing apparatus according to claim 1 and also comprising means for providing an output indication of tare weight in response to inputs from said sensing means.

3. Weighing apparatus according to claim 1 and also comprising means for determining the gross weight of the container and means for subtracting the tare weight of the container from the gross weight for providing an output indication of the net weight of the liquid contained within the container.

4. Weighing apparatus according to claim 1 and wherein said spring satisfies the relationship:

$$W_b = k\delta$$

where
  $W_b$ is the weight of the auxiliary base, motor and eccentrically disposed weights;
  k is the spring rate of the spring; and $$\delta = (g/\omega^2)$$

$\omega$ = frequency of vibration of the auxiliary base in radians.

* * * * *